United States Patent
Spencer

(10) Patent No.: US 8,677,133 B1
(45) Date of Patent: Mar. 18, 2014

(54) SYSTEMS AND METHODS FOR VERIFYING AN ELECTRONIC DOCUMENTS PROVENANCE DATE

(75) Inventor: Gregory Reeves Spencer, Campbell, CA (US)

(73) Assignee: Google Inc., Mountain View, CA (US)

(*) Notice: Subject to any disclaimer, the term of this patent is extended or adjusted under 35 U.S.C. 154(b) by 1042 days.

(21) Appl. No.: 12/368,587

(22) Filed: Feb. 10, 2009

(51) Int. Cl.
*H04L 9/32* (2006.01)
*G06Q 20/00* (2012.01)

(52) U.S. Cl.
USPC .......................................... 713/178; 705/76

(58) Field of Classification Search
None
See application file for complete search history.

(56) References Cited

U.S. PATENT DOCUMENTS

| | | | | |
|---|---|---|---|---|
| 5,136,646 | A * | 8/1992 | Haber et al. | 713/178 |
| 5,606,609 | A * | 2/1997 | Houser et al. | 713/179 |
| 6,381,344 | B1 * | 4/2002 | Smithies et al. | 382/115 |
| 6,601,172 | B1 * | 7/2003 | Epstein | 713/178 |
| 6,640,301 | B1 * | 10/2003 | Ng | 713/156 |
| 6,978,376 | B2 * | 12/2005 | Giroux et al. | 713/189 |
| 7,519,824 | B1 * | 4/2009 | Peyravian et al. | 713/178 |
| 7,958,349 | B2 * | 6/2011 | Parkinson | 713/158 |
| 2003/0028605 | A1 * | 2/2003 | Millett et al. | 709/206 |
| 2003/0159048 | A1 * | 8/2003 | Matsumoto et al. | 713/178 |
| 2004/0261016 | A1 * | 12/2004 | Glass et al. | 715/512 |
| 2005/0038787 | A1 * | 2/2005 | Cheung et al. | 707/9 |
| 2006/0005028 | A1 * | 1/2006 | Labaton | 713/176 |
| 2007/0050626 | A1 * | 3/2007 | Tokie et al. | 713/176 |
| 2007/0156768 | A1 * | 7/2007 | Harrington et al. | 707/200 |
| 2008/0091735 | A1 * | 4/2008 | Fukushima et al. | 707/200 |
| 2009/0024673 | A1 * | 1/2009 | Barker et al. | 707/203 |
| 2009/0132539 | A1 * | 5/2009 | Hockey | 707/10 |
| 2010/0153511 | A1 * | 6/2010 | Lin | 709/207 |

FOREIGN PATENT DOCUMENTS

WO    WO92/03000    *  2/1992    ................ H04L 9/00

OTHER PUBLICATIONS

Escrowed Encryption Standard (EES), Federal Information Processing Standards Publication 185, Feb. 9, 1994, 7 pages, http://www.itl.nist.gov/fipspubs/fip185.htm, downloaded Dec. 15, 2008.
Sheffield Richard, "The Keys to a Reliable Escrow Agreement," date unknown, 6 pages.

* cited by examiner

*Primary Examiner* — Cordelia Zecher
*Assistant Examiner* — Abdullah Almamun
(74) *Attorney, Agent, or Firm* — Lerner, David, Littenberg, Krumholz & Mentlik, LLP

(57) ABSTRACT

The present invention validates provenance dates of electronic documents. A document version date may be determined by creating a unique checksum for the document and having the document's owner digitally sign it with a private key. The checksum and digital signature are securely stored by an authorization entity along with a timestamp fixing the date/time. A unique resource identifier is returned to the user. Subsequently, if the document's date needs to be proved to a third party, a verification program is applied to the original document to create a new checksum. The unique resource identifier is used to retrieve the signed checksum from the authorization entity. Upon verification of matching checksums, the timestamp provided by the authorization entity proves the date/time the document existed. In addition, the public key provided by the document owner proves that the checksum was signed by the owner's private key, proving their ownership.

3 Claims, 6 Drawing Sheets

US 8,677,133 B1

SYSTEMS AND METHODS FOR VERIFYING AN ELECTRONIC DOCUMENTS PROVENANCE DATE

BACKGROUND OF THE INVENTION

1. Field of the Invention

The present invention relates generally to document authenticity and, more particularly, to verifying the date a document was created or existed.

2. Description of Related Art

Document management is very important in electronic commerce applications. For instance, a digital watermark may be employed to embed information into a digital file. This information may be used to deter unauthorized copying of the digital file. Content restrictions may be added to digital media such as music or movies to limit the number of legal copies which can be made. Furthermore, a digital file may be encrypted for security purposes as part of content distribution.

While such processes may deter theft or unauthorized copying, they do not provide a mechanism to prove to a third party when a particular piece of content was created or modified.

BRIEF SUMMARY OF THE INVENTION

Aspects of the present invention provide the ability to specify the creation/modification date of a piece of content. Such information may be stored and subsequently validated by an authorization entity. This may be done while the original content is securely maintained by the content's originator or owner.

In accordance with one embodiment of the present invention, a method of securely dating an electronic document is provided. The method comprises obtaining a digest application from an authorization entity; applying the digest application to an electronic document to create a unique checksum associated with the electronic document; electronically signing the unique checksum using a digital signature to create a signed checksum; providing the signed unique checksum to the authorization entity for secure storage; and creating a unique resource identifier for use in verifying the unique checksum.

In one alternative, the method further comprises receiving a timestamp specifying a time when the signed unique checksum was received by the authorization entity. In another alternative, the digest application is a transparent scripting application. In a further alternative, the digital signature comprises an encrypted version of the electronic document.

In another alternative, the unique checksum comprises a cryptographic checksum. In this case, the cryptographic checksum may be an SHA-2 checksum.

In yet another alternative, subsequent to applying the digest application to the electronic document to create the unique checksum, the electronic document is placed in secure storage so that it is not modified.

In accordance with another embodiment of the present invention, a method for confirming a provenance date of an electronic document is provided. The method comprises obtaining the electronic document from a document provider at a first node of a computer network; obtaining a verification application from an authorization entity at a second node of a computer network; executing the verification application on the electronic document to create a verification checksum associated with the electronic document; providing a unique resource identifier and a decryption key to obtain a comparison checksum from the authorization entity, the authorization entity maintaining a timestamp specifying a time when the comparison checksum was signed; and comparing the verification checksum with the comparison checksum, wherein if the verification checksum matches the comparison checksum, the provenance date of the electronic document is confirmed by the timestamp.

In one example, the method further comprises receiving the timestamp from the authorization entity along with the comparison checksum. And in another example, the verification application is a transparent scripting application.

In accordance with a further embodiment of the present invention, a system for setting and validating a provenance date of an electronic document is provided. The system comprises storage means for securely storing data associated with the provenance date of the electronic document and a processor logically coupled to the storage means. The processor is operable to receive a checksum signed by a digital signature from a user. The signed checksum uniquely corresponds to the electronic document. The processor is further operable to generate a timestamp corresponding to receipt of the signed checksum, to securely store the signed checksum and the timestamp in the storage means, to generate a unique resource identifier associated with at least one of the signed checksum and the timestamp, and to provide the unique resource identifier to the user.

In one alternative, the processor is further operable to provide a digest application to the user to generate the checksum. In this case, the digest application desirably comprises a transparent scripting application for generating the checksum.

In another alternative, the processor is further operable to concatenate the signed checksum and the timestamp together and to digitally sign the concatenated checksum and timestamp prior to storage in the storage means. In this case, the processor may be further operable to retrieve the signed checksum and the timestamp, to decrypt the checksum, and to return the decrypted checksum and the timestamp to a third party upon receipt of the unique resource identifier from the third party.

In another example, the processor is further operable to receive the unique resource identifier from a third party, to retrieve the stored signed checksum and the timestamp based on the unique resource identifier, and to provide provenance validation information to the third party. In this case, the processor may be further operable to receive a key from the third party and to apply the key to the signed checksum to create a confirmation checksum, wherein the provenance validation information includes the confirmation checksum. Here, the key may be applied to the signed checksum by the processor to decrypt the signed checksum and verify it is valid.

DETAILED DESCRIPTION

The aspects, features and advantages of the present invention will be appreciated when considered with reference to the following description of preferred embodiments and accompanying figures. The following description does not limit the present invention; rather, the scope of the invention is defined by the appended claims and equivalents.

Aspects of the invention provide systems and methods for proving or otherwise identifying the date when a document of interest was created, modified or otherwise in existence. In an embodiment, a distributed, networked system enables a user system and/or a third party system to couple to an authorization entity to set or validate the document's provenance date.

Figure 1:
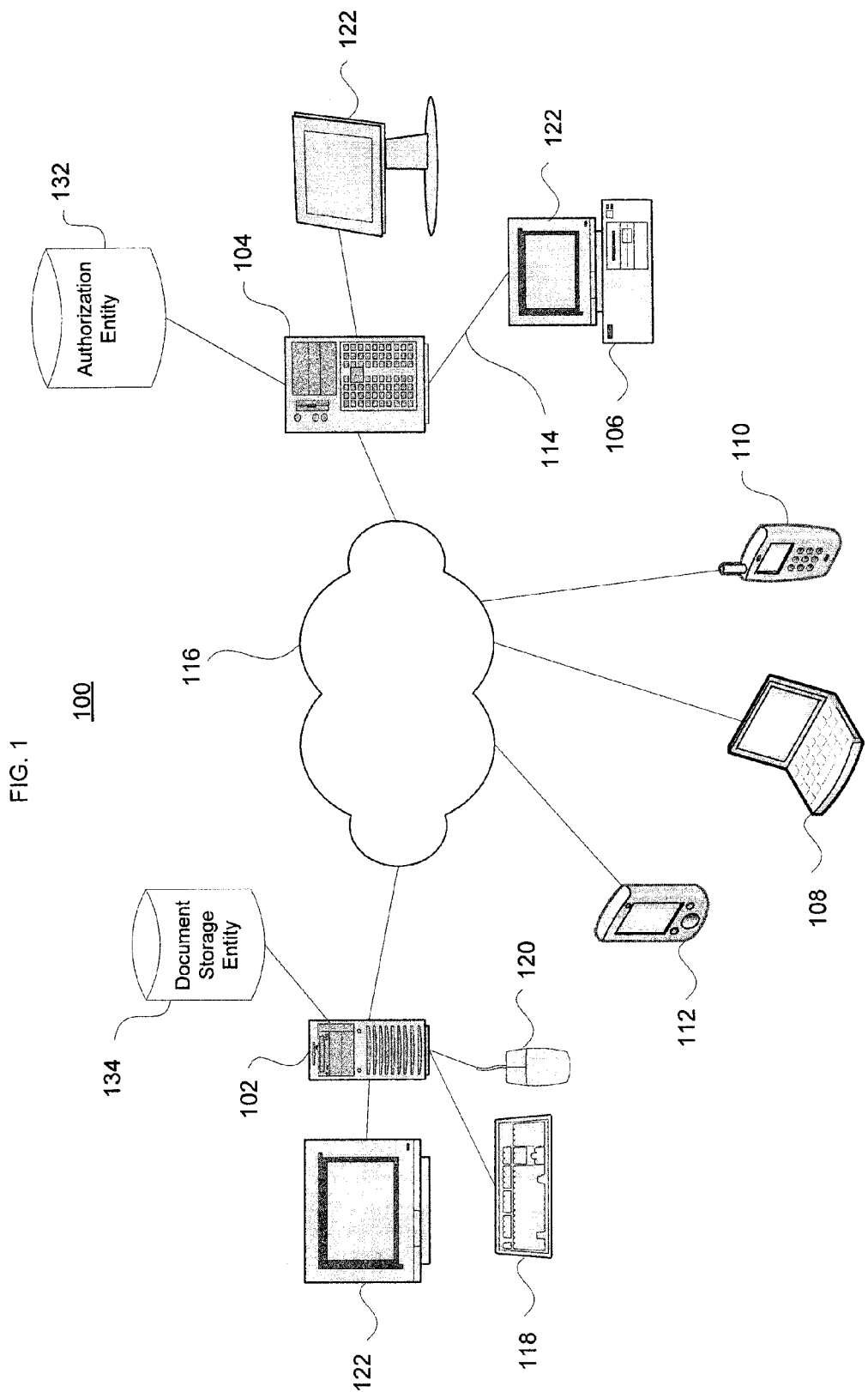
FIG. 1 illustrates a system in accordance with aspects of the invention.

FIG. 1 presents a schematic diagram of a computer system depicting various computing devices that can be used alone or in a networked configuration in accordance with aspects of the present invention. For example, this figure illustrates a computer network 100 having a plurality of computers 102, 104, 106 and 108 as well as other types of devices such as portable electronic devices such as a mobile phone 110 and a PDA 112. Such devices may be interconnected via a local or direct connection 114 and/or may be coupled via a communications network 116 such as a LAN, WAN, the Internet, etc. and which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop.

Figure 2:
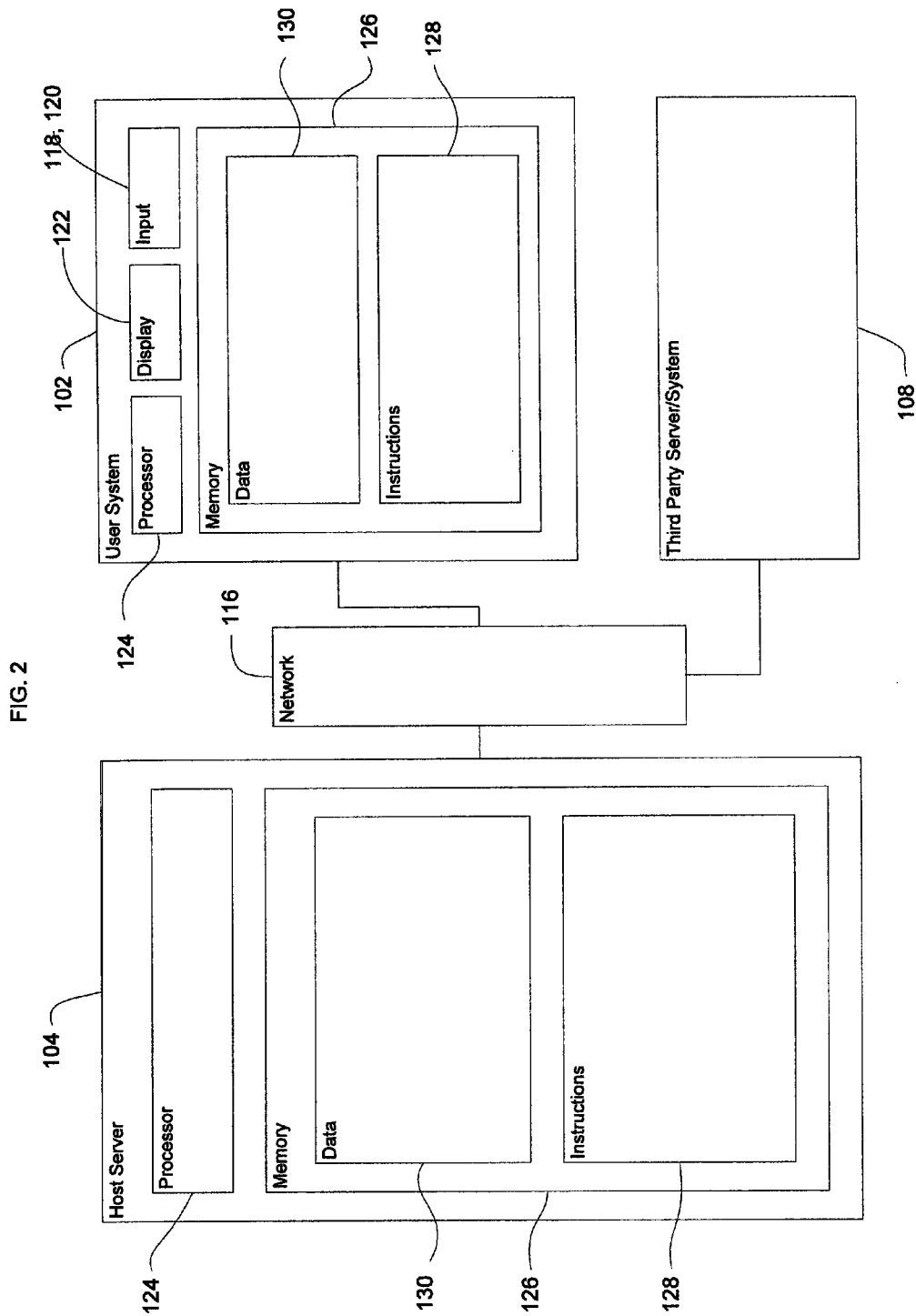
FIG. 2 illustrates aspects of the system of FIG. 1.

As shown in FIG. 2, each computer such as computers 102 and 104 contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, or flat files.

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

In accordance with aspects of the invention, the data may comprise one or more electronic documents. There is no limit to the size of a document. For instance, it may contain a few bytes of data or petabytes of data. Furthermore, a given document may comprise one or more files, a data set stored in a database, a web cache, etc. Depending on the size and content of the document, parts of the document may be stored or otherwise maintained separately.

Although the processor 124 and memory 126 are functionally illustrated in FIG. 2 as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like.

In one aspect, server 104 may communicate with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and user computers and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and user devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110.

As shown in FIG. 1, the network 100 may also include an authorization entity 132, which may be directly or indirectly coupled to server 104. In an alternative, the authorization entity 132 may be part of or otherwise logically associated with the server 104. A document storage entity 134 may be part of or logically associated with a user device such as computer 102. In an alternative, the document storage entity 134 may be directly or indirectly coupled to the computer 102. In an example, the document storage entity 134 comprises data memory 130 of the computer 102.

The document storage entity 134 may securely store one or more documents in a native (raw) or encrypted format. The document storage entity 134 may be configured so that it is only accessible to selected users or devices. For instance, documents stored on the document storage entity 134 may only be accessible to authenticated users of computer 102.

The authorization entity 132 and the server 104 may comprise an authorization web server. As will be explained in more detail below, the authorization entity 132 is operable to provide applications to user devices and third party entities to validate the provenance date of a document. The authorization entity 132 is also operable to maintain provenance information for the document in a secure manner.

In many instances, it is undesirable or unfeasible to send a document to an external entity such an escrow agent or a potential purchaser. While a document may be encrypted prior to transmittal, if a document contains particularly sensitive information such as trade secrets or invention information, the owner of such information may be unwilling to send the information to an external source for storage. And in the case of a large document such as a web crawler cache or database, the size of the document may make transferring it very burdensome. Such a cache or database may be on the order of gigabytes, terabytes, petabytes or more.

In such cases, the document is desirably maintained by the owner under its control. The document may be stored in the secure document storage 134. While archival records may show when a document was placed in the secure document storage 134 for safekeeping, this may not be sufficient to prove the provenance date (e.g., the creation, modification or storage data) of the document. The authorization entity solves this problem.

Figure 3A:
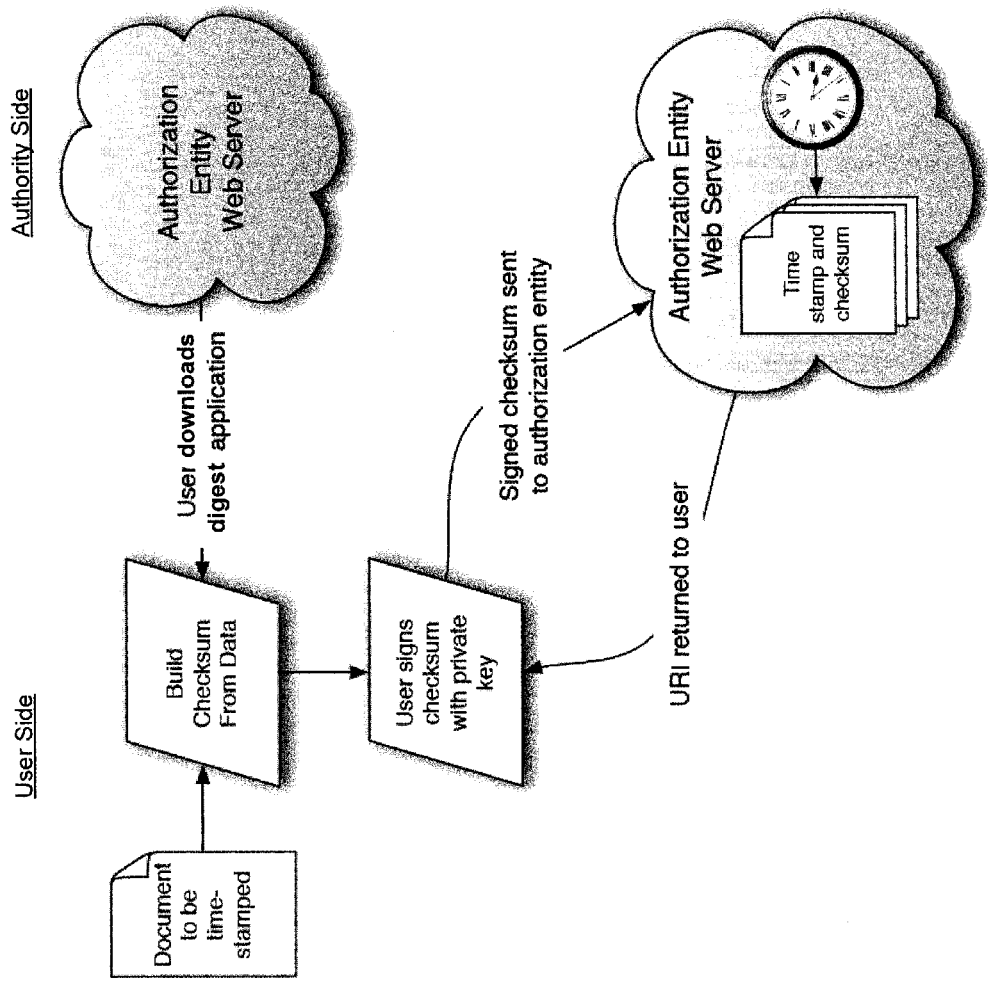
FIGS. 3A-B illustrate a system and method for obtaining a provenance date of a document in accordance with aspects of the invention.
Figure 3B:
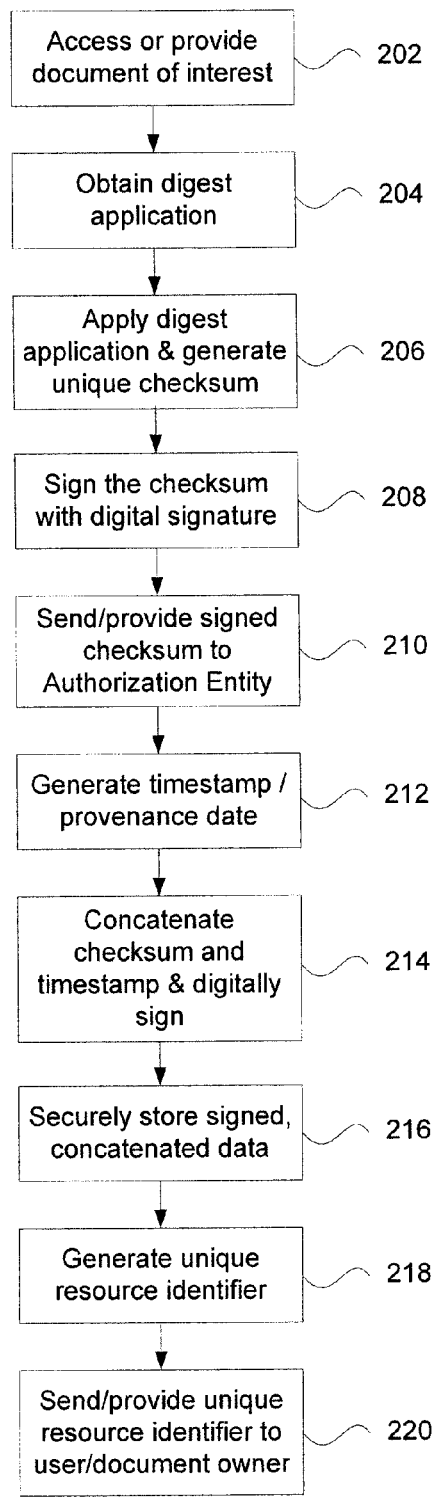

One embodiment of the present invention is shown in FIGS. 3A-B where checksum data associated with a document is used to obtain a provenance date for the document. In particular, FIG. 3A illustrates general aspects of system interaction between an authorization entity and a user. And FIG. 3B illustrates a flow diagram 200 showing generation of provenance information based on the document. The actions shown in FIG. 3A will be discussed below with regard to the flow diagram in FIG. 3B.

In particular, block 202 shows that a document of interest is accessed or otherwise provided or obtained. For instance, the document of interest may be stored in the document storage entity 134, and may be accessed by a user of computer 102. As shown in block 204, a digest application is obtained. The digest application is desirably provided by the authorization entity 132 to the user's computer.

As shown in block 206, the digest application is applied to the document of interest to obtain a unique checksum associated with the document. By way of example only, the digest application may be an applet or executable code which performs a cryptographic digest process on the document to arrive at the unique checksum.

The digest application is preferably an open source program written in a transparent scripting language such as Python. Python is provided by the Python Software Foundation. By using an open source, transparent scripting language application, the user may review the code and understand exactly what processes the digest application will perform and to ensure that the document or any other data is not processed in an unauthorized manner.

In addition to being unique, the checksum should be cryptographically secure to prevent tampering. Any number of cryptographic algorithms or hashing functions may be used by the digest application to achieve these goals. For instance, the SHA-2 family of hash functions may be employed. These functions have not been shown to produce collisions where different inputs result in an identical output. As new secure hash functions are developed, they may also be employed as long as they meet certain requirements of a cryptographic hash function. For instance, is it easy to compute the hash for any given data set? Is it extremely difficult to construct a data set that has a given hash? Is it extremely difficult to modify a given data set without changing its hash? And is it extremely unlikely that two different data sets will have the same hash? Less robust hash functions, such as MD5 and SHA-1—which are known to have collisions—are less desirable.

The checksums generated by the digest application may or may not be of fixed length. In an alternative, the digest application may be used on multiple documents.

Next, as shown in block 208, once the checksum has been generated by the digest application, a digital signature such as a user's encryption key is applied to the checksum to "sign" the checksum. The signed checksum may then be provided to the authorization entity 132 as shown in block 210. The encryption key may be a private key which has a corresponding public key. Providing the signed checksum to the authorization entity 132 may be done by any suitable means, such as via e-mail or by using a website form.

Upon receipt, as shown in block 212 the authorization entity 132 generates a timestamp specifying when the checksum was received. The timestamp may record the current time and date, for instance in year/month/day/hour/minute/second format. By way of example only, the timestamp may be of the format: 2008.12.31.17.03.47, meaning that the document's unique checksum was received at 5:03 pm and 47 seconds on Dec. 31, 2008.

As shown in block 214, the received checksum and timestamp may be concatenated together and electronically signed by a key of the authorization entity 132. The key may be a private key. The signed, concatenated data may then be stored by the authorization entity 132 in accordance with block 216.

A unique resource identifier associated with the received checksum and the timestamp may also be generated by the authorization entity 132, as shown in block 218. In one example, the unique resource identifier references data on the authorization entity's server which is signed by the user's private key. The unique resource identifier provides a method to access a certain resource and designates the particular resource to be accessed. In this example, the unique resource identifier does not contain the data/resource itself. And as shown in block 220, the unique resource identifier may be returned to the user or entity which sent the checksum to the authorization entity 132. A copy of the timestamp may also be provided to the user or sending entity.

Figure 4A:
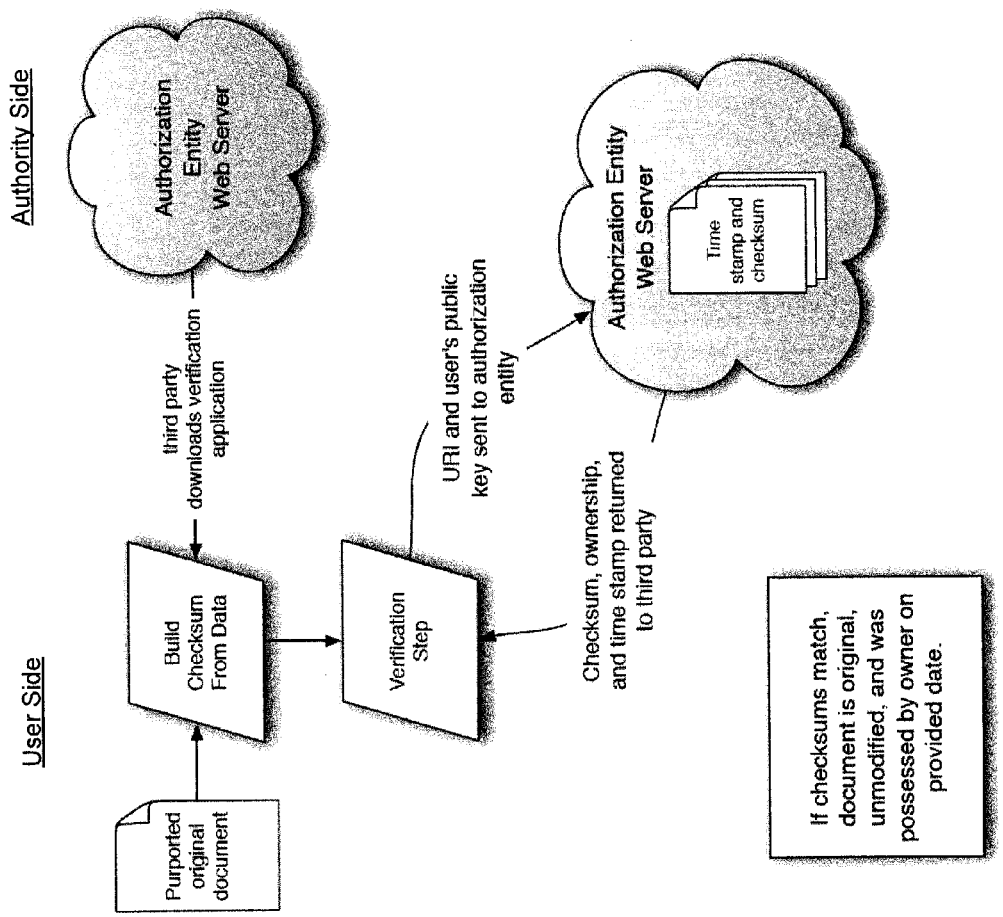
FIGS. 4A-B illustrate a system and method for validating the provenance date of a document in accordance with aspects of the invention.
Figure 4B:
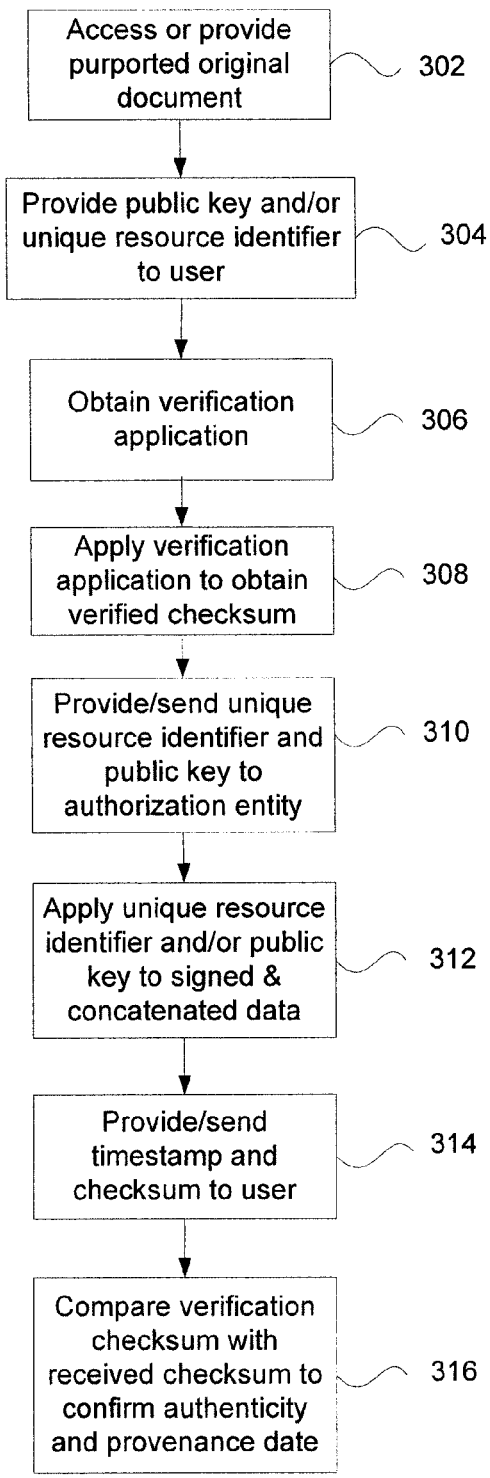

Another embodiment of the present invention is shown in FIGS. 4A-B where the provenance date for a document is validated. In particular, FIG. 4A illustrates general aspects of system interaction between an authorization entity and a user. The user may be the entity which generated the original checksum for the document using the digest application or a different entity, such as a third party seeking confirmation of the document's provenance date. And FIG. 4B illustrates a flow diagram 300 showing a process for validation of the provenance information. The actions shown in FIG. 4A will be discussed below with regard to the flow diagram in FIG. 4B.

In particular, block 302 shows that a purported original document is accessed or otherwise provided or obtained. For instance, the purported original document may be retrieved from the document storage entity 134 and may be provided to a user such as a third party entity (e.g., to a user of computer 108). A public key corresponding to the private encryption key which signed the checksum with a digital signature (see block 208) may also be provided to the user, as shown in block 304. Furthermore, the unique resource identifier is desirably also provided to the user. As shown in block 306, a verification application is obtained. The verification application is desirably provided by the authorization entity 132 to the user's computer.

As shown in block 308, the verification application is applied to the purported original document to obtain a verification checksum associated with the purported original document. By way of example only, the verification application may be an applet or executable code which performs an encryption or hashing process on the document to arrive at the verification checksum.

As with the digest application, the verification application is preferably an open source program written in a transparent scripting language such as Python. By using an open source, transparent scripting language application, the user may review the code and understand exactly what processes the verification application will perform and to ensure that the document or any other data is not processed in an unauthorized manner.

The user attempting to verify the purported original document desirably provides the unique resource identifier and the public key to the authorization entity 132 as show in block 310. Alternatively, the document owner or other entity may provide the unique resource identifier and the public key to the authorization entity 132.

As shown in block 312, the authorization entity 132 may apply the unique resource identifier and/or the public key to the signed and concatenated data which is stored by the authorization entity 132. The timestamp and checksum are obtained from the signed and concatenated data, and the authorization entity 132 provides this information to the user, as shown in block 314.

The user may then compare the checksum received from the authorization entity with the verification checksum it generated, as shown in block 316. If the checksums match, then the authenticity of the purported original document is confirmed. And the timestamp issued by the authorization entity 132 provides a provenance date to the user. Thus, the user can confirm not only the authenticity of the document it was provided, but also the exact time that the document's checksum was timestamped by the authorization entity.

In one case, the aforementioned processes may be used by an inventor to prove that he or she created an invention on or before the date provided by the timestamp. This could augment or replace the United States Patent and Trademark Office's "Disclosure Document" program. In another case, a software escrow agent may operate as an authorization entity, validating the authenticity of software as part of a contractual process.

In an alternative, the document or part of the document may be securely stored by the authorization entity in addition to the signed, concatenated data. In this case, the third party user could obtain the document directly from the authorization entity.

Furthermore, while certain processes in accordance with aspects of the invention are shown in the figures as occurring in a linear fashion, this is not a requirement unless expressly stated herein. Different processes may be performed in a different order or concurrently.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for confirming a provenance date of an electronic document, the method comprising:
    obtaining the electronic document from a document provider at a first node of a computer network;
    obtaining a verification application from an authorization entity at a second node of a computer network;
    executing the verification application on the electronic document to create a verification checksum associated with the electronic document;
    providing a unique resource identifier and a decryption key to obtain a comparison checksum that has been stored independently from the electronic document at the authorization entity, the authorization entity maintaining a timestamp specifying a time when the comparison checksum was signed; and
    comparing the verification checksum with the comparison checksum, wherein if the verification checksum matches the comparison checksum, the provenance date of the electronic document is confirmed by the timestamp.

2. The method of claim 1, further comprising receiving the timestamp from the authorization entity along with the comparison checksum.

3. The method of claim 1, wherein the verification application is a transparent scripting application.

* * * * *

UNITED STATES PATENT AND TRADEMARK OFFICE
CERTIFICATE OF CORRECTION

| | | |
|---|---|---|
| PATENT NO. | : 8,677,133 B1 | Page 1 of 1 |
| APPLICATION NO. | : 12/368587 | |
| DATED | : March 18, 2014 | |
| INVENTOR(S) | : Gregory Reeves Spencer | |

It is certified that error appears in the above-identified patent and that said Letters Patent is hereby corrected as shown below:

In The Claims

Column 8, lines 50-51, "times-tamp." should read --time-stamp--

Signed and Sealed this
Second Day of August, 2016

Michelle K. Lee
*Director of the United States Patent and Trademark Office*